(12) United States Patent
Wieczorek

(10) Patent No.: US 8,208,895 B2
(45) Date of Patent: Jun. 26, 2012

(54) CHARGING SOME OR ALL OF THE COST OF A CALL TO A CALLEE

(75) Inventor: Philippe Wieczorek, St Ismier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2710 days.

(21) Appl. No.: 10/175,284

(22) Filed: Jun. 20, 2002

(65) Prior Publication Data

US 2011/0092183 A1 Apr. 21, 2011

(30) Foreign Application Priority Data

Jun. 22, 2001 (GB) .................................. 01410076.2

(51) Int. Cl.
*H04M 11/00* (2006.01)
(52) U.S. Cl. ..................... 455/406; 379/114.22; 370/259
(58) Field of Classification Search .................. 455/406; 379/114.01
See application file for complete search history.

(56) References Cited

U.S. PATENT DOCUMENTS

| | | | |
|---|---|---|---|
| 4,933,933 A | 6/1990 | Dally et al. ..................... 370/60 |
| 5,473,671 A | 12/1995 | Partridge, III .................. 379/59 |
| 5,602,907 A | 2/1997 | Hata et al. ..................... 379/114 |
| 5,822,411 A | 10/1998 | Swale et al. ................... 379/111 |
| 5,859,902 A * | 1/1999 | Freedman ................. 379/114.02 |
| 5,937,044 A | 8/1999 | Kim ............................... 379/121 |
| 6,138,006 A | 10/2000 | Foti ................................ 455/414 |
| 6,498,838 B1 * | 12/2002 | Schoenborn ................... 379/111 |
| 6,639,977 B1 * | 10/2003 | Swope et al. ............ 379/114.21 |
| 2001/0005372 A1 * | 6/2001 | Cave et al. ...................... 370/401 |
| 2001/0026609 A1 * | 10/2001 | Weinstein et al. .......... 379/93.01 |
| 2002/0025028 A1 * | 2/2002 | Manto ....................... 379/114.05 |

FOREIGN PATENT DOCUMENTS

| | | |
|---|---|---|
| WO | 99/16265 | 4/1999 |
| WO | 00/38403 | 6/2000 |

* cited by examiner

*Primary Examiner* — Marcos Batista

(57) ABSTRACT

A telecommunications system in which subscribers are provided with accounts against which services are billed, the system being of the type in which calls are normally billed to calling parties, wherein the system has a mode in which, before a usable voice channel is established between a caller and a callee, the callee is presented with a charging option whereby the callee may unilaterally opt to pay some or all of the cost of a particular incoming call from their subscriber account, a charging instruction being sent to a billing system associated with the subscriber account of the callee if the callee accepts the charging option and otherwise to a billing system associated with the caller.

16 Claims, 2 Drawing Sheets

CHARGING SOME OR ALL OF THE COST OF A CALL TO A CALLEE

DESCRIPTION OF AND BACKGROUND TO THE INVENTION

This invention relates to a telecommunications system, to a method of charging some or all of the cost of a call to a callee, a method of debiting a prepay account of a telecommunications subscriber and to telecommunications apparatus.

Currently, in the field of telecommunications systems, a number of charging approaches exist, by which the cost of a call is determined and charged. Usually, the cost is borne by the caller, although it is also possible to make "collect" calls (otherwise known as "reverse charge" calls) where the cost of the call is borne by the recipient.

U.S. Pat. No. 4,933,966 describes a telephone system which uses a microprocessor control system, a speech generator and speech memory to automatically place collect calls without the need of a live operator. The microprocessor control system and a speech record/playback generator are used to receive a destination number and a recorded name from a user. The speech generator is used to play audio messages to prompt the user throughout the process. A called party is informed via synthesized speech messages of the identity of the user. Responses from the called party are received through a DTMF receiver. A communication path is established through a telephone line interface if the phone receives a response indicating that the called party accepts the charges for the collect call. The microprocessor control system generates a billing record of the call which is stored in a call record memory.

U.S. Pat. No. 6,138,006 describes a technique for informing a called mobile station operating in a visited mobile switching centre (V-MSC) that an incoming call is a collect call prior to delivering the incoming call to the mobile station. The system obtains, in an originating mobile switching centre (O-MSC), a collect call prefix from a calling party and determines from the collect call prefix that the incoming call is a collect call. A collect call indication (CCI) is generated and sent along with the calling number to the V-MSC in a Location Request (LocReq) Invoke message and a Routing Request (RoutReq) Invoke message, thereby notifying the V-MSC that there is an incoming call for the mobile station and that the incoming call is a collect call. The V-MSC sets a collect call flag to ON, stores the calling number in a subscriber record in the V-MSC, and determines whether the mobile station is a digital mobile station. If so, a Short Message Service (SMS) message including the calling number is sent to the mobile station informing the subscriber that the incoming call is about to be delivered and that the incoming call is a collect call. If the mobile station is a dual-capable mobile station, a distinctive ringing signal is sent to the mobile station. The incoming call is then delivered to the mobile station, and the subscriber may choose to answer or not. The collect call flag is then reset to OFF in the subscriber record in the V-MSC.

Moreover, systems in which calls are selectively billed to the caller or to the callee at the election of the callee are known. For instance, in the context of a cellular telephone system in which callees must pay for incoming calls, U.S. Pat. No. 5,473,671 describes a divergent call treatment technique which involves a list of accepted callers that is provided by the subscriber and maintained in a database by a service provider. When a call comes in, a determination is made as to whether the caller is an "accepted" caller. If so, the call is forwarded to the cellular telephone. Otherwise, the caller is offered the option to pay for the call. A willingness on the part of the caller to pay for the call is indicated by a signal from the caller, such as pressing a key on a DTMF pad. In response to such a signal, the call is forwarded to the cellular telephone. In the absence of such a signal, the call is disconnected or diverted.

Telecommunication systems that allow a subscriber to prepay for services have recently become popular. The advantage for the service provider of prepay arrangements, which are usually provided in relation to cellular or wireless systems, is that the service provider obtains payment in advance, saving costly collection services and the need to obtain security such as credit card information from the subscriber. For the subscriber, the advantage is that the subscriber pays as the system is used, thus avoiding basic monthly service charges when usage is low.

A feature of many such systems is that prepaid airtime has validity that is limited in time, so that prepaid airtime not used before the end of a billing period is lost. The advantage of this arrangement for the service provider is that some continual revenue income from subscribers is ensured, in that even subscribers with very low usage need to purchase at least some prepaid time in each billing period, in order to maintain their account "active". However, the feature gives subscribers the impression that airtime which has been paid for may inadvertently be being lost and that some subscribers may in practice be being forced to purchase services that they neither want, use nor need.

The present invention is directed to providing a telecommunication system in which subscribers can be given greater control and flexibility in relation to how prepaid airtime is used and which allows them more easily to ensure full use of their own prepaid airtime. The system may also in at least some circumstances have advantages for the service provider in that it allows the actual use of airtime to be estimated more accurately on the assumption that all airtime that has been paid for will actually be used.

SUMMARY OF THE INVENTION

In accordance with a first aspect of the present invention, there is provided a telecommunications system in which subscribers are provided with accounts against which services are billed, the system being of the type in which calls are normally billed to calling parties, wherein the system has a mode in which, before a usable voice channel is established between a caller and a callee, the callee is presented with a charging option whereby the callee may unilaterally opt to pay some or all of the cost of a particular incoming call from their subscriber account, a charging instruction being sent to a billing system associated with the subscriber account of the callee if the callee accepts the charging option and otherwise to a billing system associated with the caller.

The present invention is thus directed to providing "reverse call payment" functionality in the absence of a request made by the caller, in other words entirely at the election of the callee.

In systems in which callees must normally pay for incoming calls, the need to provide a mechanism whereby callees can filter incoming calls arises naturally. In contrast, the present invention provides a mechanism whereby callees can be given the ability to unilaterally and positively accept call charges when they would not normally have to bear such charges.

This facility is particularly useful in prepay systems where it gives subscribers greater flexibility in using prepaid airtime before it expires at the end of a billing period.

Preferably, the charging option is displayed to the callee, conveniently using a display module of the callee's telecommunications device.

The charging option preferably is displayed in an alphanumeric format, using an in-built graphics display capability of the telecommunications device.

The callee may be provided with call-specific information concerning at least one of caller identity, caller location and approximate call cost, to the callee, per unit time.

The callee may also be provided with call balance information relating to the callee's subscriber account.

The call balance information may relate, inter alia, to the duration of any prepaid airtime belonging to the callee at that time and/or to the financial value of any such remaining airtime.

The call balance information may be used, in conjunction with at least some of the call-specific information, to provide the callee with an indication of the maximum permissible durations of the call, should the callee opt to pay for some or all of the cost thereof.

Thus, using call-specific information such as caller identity and the approximate call cost per unit time, in association, for example, with information concerning the callee's prepaid airtime balance, the callee may make an informed decision as to whether or not he/she wishes to contribute to the cost of the incoming call.

In subscriber systems that do not permit unused prepaid calls to be "carried over" to a following billing period, this allows a callee to make use of some or all of the unused prepaid calls, giving the callee satisfaction, in that the prepaid airtime has not been wasted. In addition, the invention allows calls to be paid for by the callee even where the caller has made no explicit request for this to occur. Thus, "reverse payment" calls can be effected without the necessity for the caller to go through time-consuming "collect call" procedures.

Sending the charging instruction preferably is effective to establish, or make usable, the voice channel between the caller and the callee. In this way, the parties can only communicate effectively once a decision has been made as to who is to pay for the cost of the call.

The telecommunications system preferably comprises a cellular or wireless (henceforth "mobile") telecommunications system.

Thus, the call balance information may conveniently be obtained from a Service Data Point (SDP) associated with the callee.

The Service Data Point may correspond to the callee's Home Location Register (HLR) where the callee's telecommunications device is a mobile telephone operable with the GSM network.

The billing system preferably is associated with a call charge register.

The call charge register, acting upon the charging instruction, may effect an appropriate debit of the callee's call balance during, or upon termination, of the call.

Where the call is made from a mobile telecommunications device, the call specific information may be provided to the callee via one or more Service Switching Points (SSP's).

The charging option may be provided to the callee using a Short Message Service (SMS) capability.

The charging instruction may be sent to the call charge register as part of a Call Data Record (CDR) command.

The CDR command may be generated by a SSP.

To enable a more interactive call cost facility, the charging instruction may also be conveyed to the caller. Upon receipt of the charging instruction, the caller may decide to terminate the call, if, for example, the callee has opted not to contribute to the cost thereof. On the other hand, if the callee has opted to pay an insufficient proportion of the cost, the system may be operative to dispatch, if so requested by the caller, an appropriate response, conveniently using a SMS capability, asking the callee to contribute a greater proportion of the anticipated cost.

In this way, cost negotiations may occur between the caller and the callee.

Generation of the charging instruction may be effected by pressing an appropriate button or switch (for example) on the callee's telecommunications device, this action being effective to cause a destination SSP to generate an appropriate CDR command and pass the CDR command to the call charge register.

To convey the charging instruction to the caller, the charging instruction may be incorporated within or added to a connect signal which is dispatched, in otherwise conventional manner, back towards a source SSP.

Alternatively, the caller may be advised of the callee's decision on an audible basis, conveniently by using an Intelligent Peripheral which is effective to convey an automated voice announcement to the caller. The Intelligent Peripheral preferably is operatively connected with the destination SSP or source SSP such that receipt by the appropriate SSP of the charging instruction is effective to request the Intelligent Peripheral to convey the voice announcement to the caller.

As a further alternative, one of at least two different charging instructions may be sent using the callee's telecommunications device. In this way, the callee, upon receipt of an incoming call, may elect, on the one hand, to accept the call and all the associated charges or, on the other hand, may elect to accept the call but to pay none or a proportion of the expected call cost. The Intelligent Peripheral may thus be adapted to convey one of a plurality of different voice announcements to the caller, in accordance with the specific charging instruction that is sent.

Preferably, presentation of the charging option to the callee is made automatically, in that no substantive caller involvement is required. Similarly, presentation of the charging option may be made to the callee regardless of the nature of call and the location of the caller and/or callee.

In this way, it will be appreciated that a callee, independently of any caller input, may opt to pay some or all of the cost of the call. This contrasts clearly with the known prior art "collect call" arrangements, which all rely on positive caller decisions being made at the outset.

The mode may be selected by a subscriber, as part of the telecommunications "package" to which a subscription is made. Thus, a subscriber may activate the mode, in a manner akin to selecting a "Caller ID" option, when the subscriber's account is first set up. Alternatively, the mode could be selected at a later date, as part of an "add-on" option.

As a further alternative, a subscriber may opt for the mode to be made active only in response to certain incoming calls.

In accordance with a second aspect of the present invention, there is provided a telecommunications system having a mode in which some or all of the cost of a call is charged to a callee comprising:

a) initiating a connection between a caller and the callee,
b) providing the callee with a charging option, whereby the callee may opt to pay some or all of the cost of the call,
c) generating a charging instruction, and
d) sending the charging instruction to a call charge register so that the cost of the call may be charged in accordance with the charging instruction; characterised in that e) the callee is provided with cost rate information concerning the approximate cost of the call, per unit time.

Preferably, the charging option and/or the cost rate information is displayed to the callee.

The invention, in its second aspect, may comprise one or more of the features described in relation to the first aspect of the present invention.

In accordance with a third aspect of the present invention there is provided, in a telecommunications subscriber environment, a method of charging some or all of the cost of a call to a callee, the recipient having a prepay account facility with a service provider, the method comprising:
a) initiating a connection between a caller and the callee,
b) providing the callee with a charging option, whereby the callee may opt to pay some or all of the cost of the call by effecting an appropriate debit of the callee's prepay account,
c) receiving, from the callee, a charging instruction, and
d) sending the charging instruction to a call charge register so that the cost of the call may be debited from the prepay account in accordance with the charging instruction.

The call charge register may contain charging information relating to a plurality of subscribers.

In accordance with a fourth aspect of the present invention there is provided a method of debiting a prepay account of a telecommunications subscriber comprising, on receipt of an incoming call, instructing a call charge register to charge some or all of the cost of the call to the callee's prepay account.

The call charge register may be operatively associated with a plurality of subscribers' prepay accounts.

In accordance with a fifth aspect of the present invention there is provided a telecommunications system of the type in which calls are normally billed to calling parties, the system having a subscriber-selectable mode in which some or all of the cost of the call is charged to a callee, use of the mode comprising:
a) initiating a connection between the caller and the callee,
b) providing the callee, via a separate signalling connection, with a charging option, whereby the callee may opt to pay some or all of the cost of the call,
c) generating a charging instruction, and
d) sending the charging instruction to a call charge register so that the cost of the call may be charged in accordance with the charging instruction.

In accordance with a sixth aspect of the present invention, there is provided a method of charging some or all of the cost of a call to a callee comprising:
a) initiating a connection between the caller and the callee,
b) providing the callee with a charging option, whereby the callee may opt to pay some or all of the cost of the call,
c) generating a charging instruction, and
d) sending the charging instruction to a call charge register so that the cost of the call may be charged in accordance with the charging instruction; characterised in that
e) the connection between the caller and callee is only completed subsequent to the generation of the charging instruction, such that the caller is only able to communicate with the callee once the charging instruction has been sent.

In accordance with a seventh aspect of the present invention there is provided telecommunications apparatus for charging some or all of the cost of a call to a callee, comprising:
a) a charging option receiving element operative to allow the callee to receive a charging option,
b) a charging instruction generation element, and
c) a charging instruction dispatch element operative to dispatch the charging instruction to a call charge register so that the cost of the call may be charged in accordance with the charging instruction.

The apparatus may further comprise a charging option display element, operative to display the charging option to the callee.

BRIEF DESCRIPTION OF THE DRAWINGS

The invention, in its various aspects, will now be described, in greater detail, but strictly by way of example only, by reference to the accompanying drawings, of which.

BEST MODE OF THE INVENTION

Figure 1:
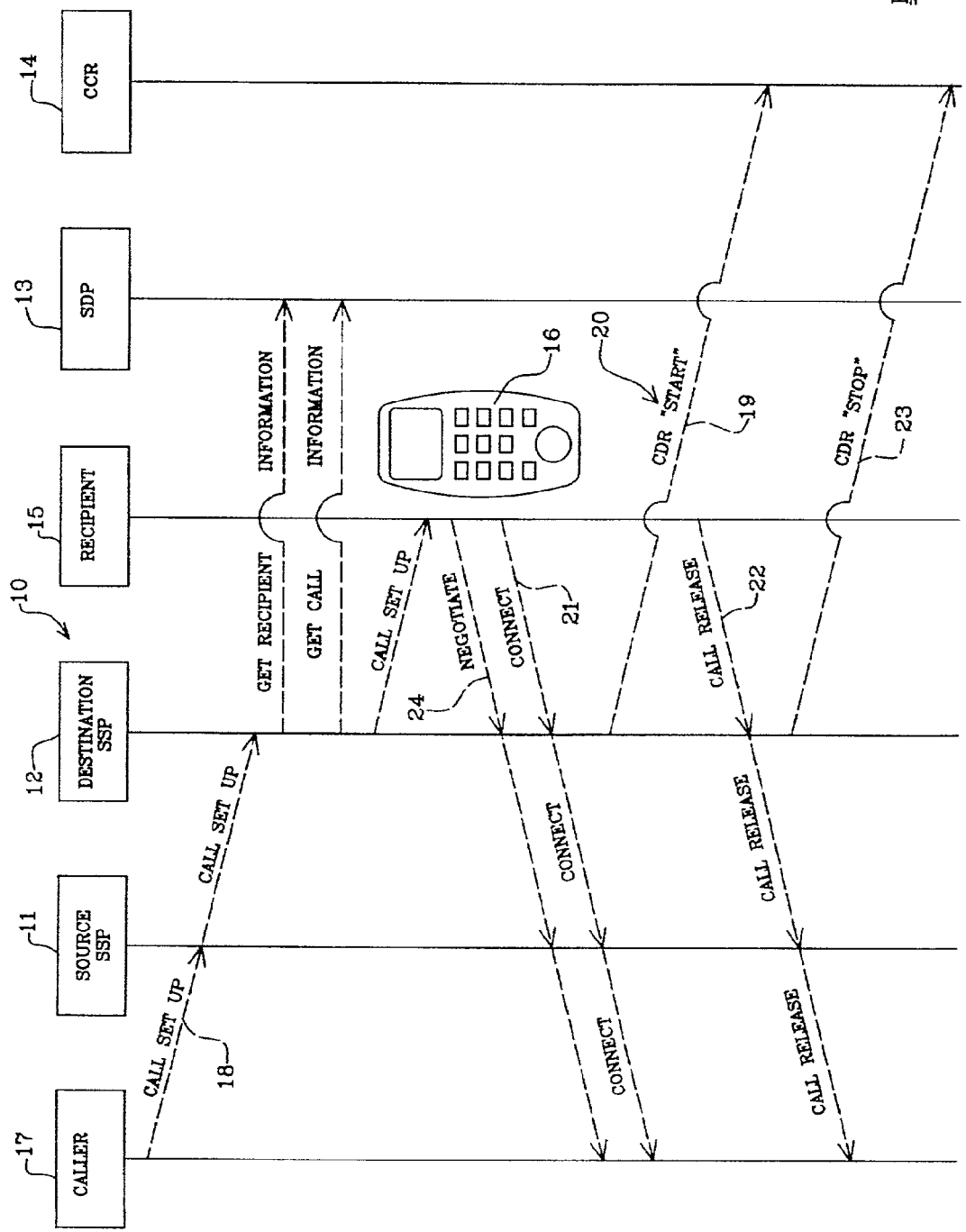
FIG. 1 is a schematic, step-by-step illustration showing how the invention may be put into practice.

Referring first to FIG. 1, this shows, in schematic form, a mobile communications network 10 having, in generally conventional manner, a source SSP (Service Switching Point) 11, a destination SSP 12, a Service Data Point (SDP) 13 which, in the case of a GSM network constitutes a Home Location Register (HLR) and a call charge register 14 which may be provided by a Billing System Server, or BSS.

When a call to a callee 15 is initiated (in practice, of course, the call is directed towards the callee's handset 16), a call set-up process is commenced, originating with the caller 17. First of all, the caller's nearest cell (the source SSP 11) receives a signal 18 and forwards this to the callee's nearest cell, identified using information obtained from the callee's Visitor Location Register (VLR), as is known generally in the art. The call set-up procedure is finalised by passing the signal 18 to the callee 15, with call-specific information being retrieved, at that time, from a Service Data Point (SDP) 13. At this point, no usable communication link exists between the caller 17 and the callee 15, as the call set-up process has yet to be completed.

The SDP 13 contains information relating to the callee's call balance, such as the callee's remaining monthly prepaid airtime and prepaid monthly call value, with some or all of this information being passed to the callee's telephone 16, for display thereupon. Similarly, call-specific information, such as the identity of the caller, the caller's location and the approximate call cost per unit time, is displayed on the handset 16. This information, which conveniently is passed to the callee's handset 16 using a SMS capability, enables the callee to decide whether or not to contribute to the cost of the incoming call. Thus, the callee may then respond to a SMS-based charging option, dispatched from the SDP 13, by generating, in the handset 16, a charging instruction 19, and sending the charging instruction 19 to the call charge register 14. The charging instruction 19, which forms part of a Call Data Record (CDR) "START" command 20, provides the call charge register with information concerning the source of the call, the call destination, the date and time of the call initialisation in addition to the charging instruction, which informs the call charge register which party to the call is to bear some or all of the cost.

In order to complete the thus-arranged call connection, a connect signal 21 is sent to the destination SSP 12, forwarded to the source SSP 11 and subsequently passed back to the original caller 17.

At this point, the caller and callee can converse or exchange data, in conventional manner. Similarly, the call connection is maintained in generally conventional manner, until one of the parties terminates the call link. When this occurs, a call release signal 22 is conveyed from the callee 15 to the caller 17 via the destination and source SSP's 12 and 11, with a CDR "STOP" command 23 being sent, at the same time, to the call charge register 14, to terminate the billing process initiated by the CDR "START" command 20.

A further embodiment of the invention envisaged by the applicants allows a degree of cost negotiation to be undertaken between the caller 17 and the callee 15. To effect this, the callee 15, on receipt of the incoming call set-up instructions 18, may, if he/she does not wish to pay all (or indeed any) of the resulting call cost, dispatch an appropriate negotiation signal 24 back to the caller 17, prior to accepting the call, and thus prior to completing the resulting call connection. On receipt of the negotiation signal 24, which may be conveyed using a SMS capability, the caller 17 has two options. The first, which will apply when the response received from the callee is unacceptable, is to terminate the call sequence by effecting a "hang up" step.

On the other hand, if the caller 17 is prepared to contribute part of the cost of the call, an appropriate response (not shown for reasons of clarity) may be dispatched back to the callee 15, proposing an alternative cost apportionment, for example. Should this be acceptable to the callee 15, the recipient 15 may then forward the agreed charging instruction to the call charge register 14, in a manner substantially as previously described, thus allowing the call connection to be completed.

Figure 2:
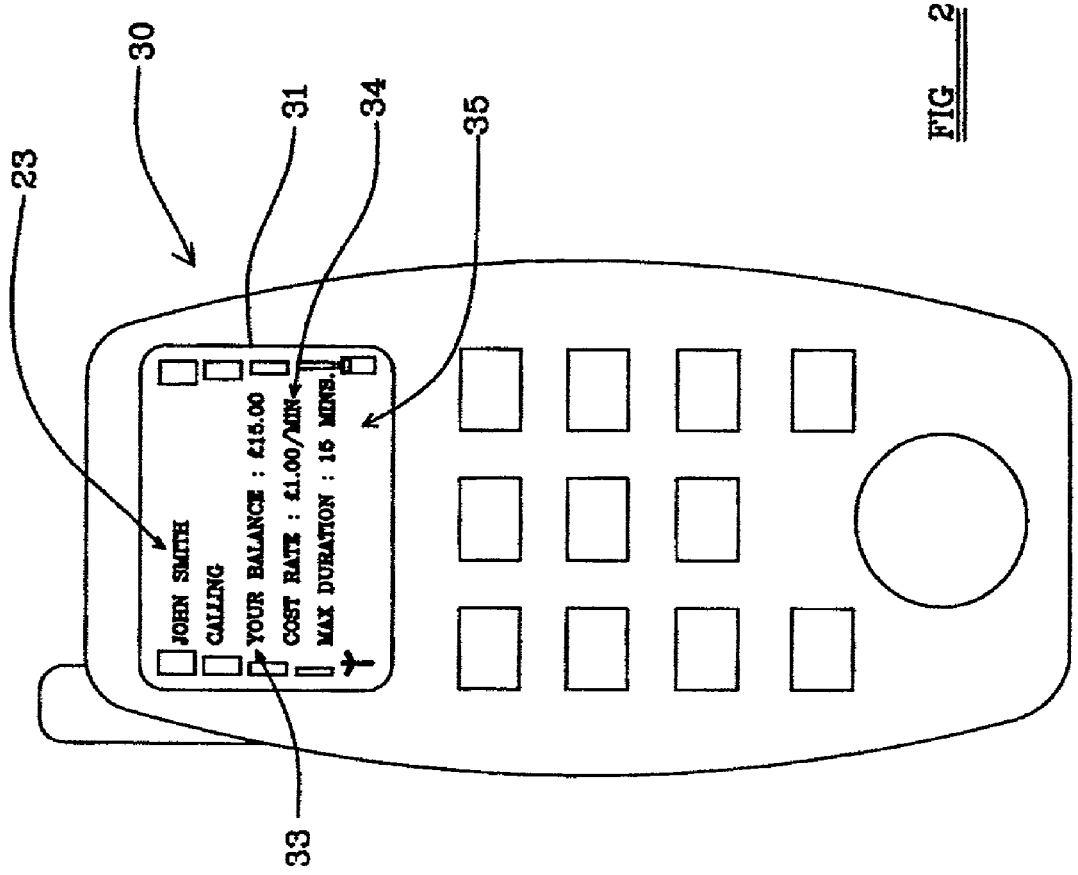
FIG. 2 is an illustration of a mobile communications device conveying display information in accordance with the present invention.

Referring next to FIG. 2, this illustrates, in somewhat general form, a mobile telephone handset 30 having a LCD display screen 31 of generally conventional type. However, the specific information shown in FIG. 2 is illustrative of the present invention, in that caller identity information 32 is provided by the handset 30, in conjunction with call balance information 33 which informs the user of the handset 30 (i.e. the callee) of the level of credit associated with his/her mobile account. In addition, an indication 34 of the approximate call cost per unit time is provided, with the call balance information 33 and the call cost information 24 being used to calculate the approximate maximum duration of the call that would be permitted if the callee were to pay all of the incoming call costs.

From the callee's perspective, this is clearly very useful, in that it enables the callee to gauge whether to accept the cost of the incoming call, bearing in mind that once the maximum duration has been exceeded, additional charges may be debited from the callee's account.

In summary, the present invention provides not only a convenient manner in which a callee can make use of otherwise redundant prepaid airtime, but also enables a degree of cost negotiation to occur between the parties to the call.

Whilst acknowledging that a mobile communications environment (GSM, 3G and the like) is likely to be particularly suitable, the applicants also envisage that the invention could be applied to land-based communications networks provided with appropriate display capabilities for output of the charging options and other information, and to communications networks in general that provide subscribers with a prepay account facility. Further, the applicants envisage that the invention, in its various aspects, may well be applicable to so-called "Voice Over IP" (VoIP), a system that provides telecommunications links using existing Internet protocol networks.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for use in a telecommunications system in which subscribers are provided with accounts against which services are billed, the system being of the type in which calls are normally billed to calling parties, comprising:
   receiving an initiate call signal from a telecommunications device of a particular caller;
   in response to receiving the initiate call signal and before establishing a usable voice channel between the particular caller's telecommunications device and a telecommunications device of a callee, automatically and independently of the particular caller's direct or indirect request for the callee to pay for an incoming call associated with the initiate call signal, providing the callee with a charging option to enable the callee to unilaterally opt to pay, from a subscriber account of the callee, for some or all of the cost of the incoming call; and
   in response to receiving, from the callee's telecommunications device, a signal indicating the callee's acceptance of the charging option, sending a charging instruction to a billing system associated with the subscriber account of the callee and establishing the useable voice channel, otherwise sending a billing instruction to a billing system associated with the caller.

2. The method according to claim 1 further including, enabling the charging option to be displayed on a display module of the callee's telecommunications device.

3. The method according to claim 1 further including, providing the callee with call-specific information concerning at least one of caller identity, caller location, and an approximate call cost, to the callee, per unit time.

4. The method according to claim 3 further including, providing the callee with call balance information relating to the callee's subscriber account.

5. The method according to claim 4 further including, using the call balance information, in conjunction with at least some of the call-specific information, to provide the callee with an indication of the maximum permissible duration of the incoming call, should the callee opt to pay for some or all of the cost thereof.

6. The method according to claim 4 further including, obtaining the call balance information from a Service Data Point (SDP) associated with the callee.

7. The method according to claim 4 further including, sending the charging instruction to a call charge register, the call charge register to act upon the charging instruction to effect an appropriate debit of the callee's call balance during, or upon termination, of the call.

8. The method according to claim 3 further including, receiving the initiate call signal from a mobile telecommunications device, and providing the callee with the call-specific information via one or more Service Switching Points (SSP's).

9. The method according to claim 1 wherein providing the charging option includes providing the charging option to the callee using a Short Message Service (SMS) capability.

10. The method according to claim 1 further including, conveying the charging instruction to the caller.

11. A method for use in a telecommunications system having a mode in which some of the cost of a call is optionally charged to a callee comprising:
   in response to receiving a call set-up request initiated by a particular caller, automatically and independently of the particular caller's direct or indirect request for the callee to pay for an incoming call, providing the callee with a charging option specifying that the callee may opt to pay a portion of the cost of an incoming call resulting from the call set-up request;
   receiving, from a mobile communications device of the callee, a request responsive to the charging option, for the caller to pay a remaining portion of the cost of the incoming call;
   in response to the caller's agreement to pay for the remaining portion of the cost of the incoming call, generating a charging instruction that reflects the portion of the cost of the incoming call to be paid for by the callee; and
   sending the charging instruction to a call charge register to enable the portion of the cost of the incoming call to be charged in accordance with the charging instruction.

12. The method according to claim 11 wherein providing the callee with the charging option and receiving the request for the caller to pay a portion of the cost of the incoming call includes using a Short Message Service (SMS) capability.

13. In a telecommunications subscriber environment, a method of charging some or all of the cost of an incoming call to a callee, the callee having a prepay account with a telecommunications service provider, the method comprising:
   initiating the incoming call via a telecommunications connection, the incoming call from a caller to the callee;
   automatically and independently of the caller's direct or indirect instruction to reverse a charge of the incoming call to the callee, providing the callee with a charging option, that specifies that the callee may opt to pay some or all of the cost of the incoming call by effecting an appropriate debit of the callee's prepay account, wherein providing the callee with the charging option is responsive to initiating the incoming call;
   receiving, from a mobile telecommunications device of the callee, a charging instruction responsive to the charging option; and
   in response to receiving the charging instruction, sending the charging instruction to a call charge register so that the cost of the incoming call may be debited from the prepay account in accordance with the charging instruction.

14. A method according to claim 13 wherein the call charge register contains charging information relating to a plurality of subscribers.

15. A method of using a mobile telecommunications system of the type in which calls are normally billed to calling parties, the system having a subscriber-selectable mode in which some or all of the cost of the call is charged to a callee, use of the mode comprising:
   initiating a telecommunications connection between a telecommunications device of each of the caller and the callee;
   in response to initiating the telecommunications connection, automatically and independently of a particular caller's direct or indirect request for the callee to pay for an incoming call, providing the callee, via a separate signaling connection, with a charging option that specifies that the callee may opt to pay some or all of the cost of the call;
   responsive to the callee's selecting of a charging option, sending, to the caller, a charging instruction that includes the charging option selected by the callee;
   allowing the caller and callee to negotiate an allocation of the cost of the call;
   generating a call data record start instruction that includes the negotiated allocation of the cost of the call; and
   sending the call data record start instruction to a call charge register so that the cost of the call may be charged in accordance with the call data record start instruction.

16. A method of charging some or all of the cost of an incoming call to a callee comprising:
   initiating the incoming call from a caller to the callee to establish a connection;
   in response to initiating the incoming call, automatically and without a direct or an indirect reverse-charge request from a caller, providing the callee with a charging option to enable the callee to opt to pay for some or all of the cost of the incoming call;
   receiving a charging instruction from the callee, the charging instruction responsive to the charging option and including the callee's elected charging option; and
   sending the charging instruction to a call charge register so that the cost of the incoming call may be charged in accordance with the charging instruction, the connection between the caller and callee to be completed subsequent to the receipt of the charging instruction, such that the caller is only able to communicate with the callee once the charging instruction has been sent.

* * * * *

UNITED STATES PATENT AND TRADEMARK OFFICE
CERTIFICATE OF CORRECTION

PATENT NO. : 8,208,895 B2
APPLICATION NO. : 10/175284
DATED : June 26, 2012
INVENTOR(S) : Philippe Wieczorek Page 1 of 1

It is certified that error appears in the above-identified patent and that said Letters Patent is hereby corrected as shown below:

In column 9, line 37, in Claim 13, delete "option," and insert -- option --, therefor.

Signed and Sealed this
Eighteenth Day of December, 2012

David J. Kappos
*Director of the United States Patent and Trademark Office*